United States Patent [19]

Quinlivan

[11] 4,027,839

[45] June 7, 1977

[54] HIGH ANGLE OF ATTACK AIRCRAFT CONTROL SYSTEM UTILIZING A PSEUDO ACCELERATION SIGNAL FOR CONTROL PURPOSES

[75] Inventor: Richard Paul Quinlivan, Binghamton, N.Y.

[73] Assignee: General Electric Company, Binghamton, N.Y.

[22] Filed: Mar. 30, 1976

[21] Appl. No.: 671,830

[52] U.S. Cl. ............................ 244/195; 235/150.2; 244/181; 340/27 SS
[51] Int. Cl.² ........................................ G05D 1/00
[58] Field of Search ............... 73/178 R; 235/150.1, 235/150.2; 244/181, 182, 191, 195; 340/27 R, 27 SS

[56] References Cited

UNITED STATES PATENTS

| | | | |
|---|---|---|---|
| 3,095,169 | 6/1963 | Osder | 244/181 |
| 3,446,946 | 5/1969 | Andeen | 244/195 X |
| 3,522,729 | 8/1970 | Miller | 244/182 X |
| 3,654,443 | 4/1972 | Dendy et al. | 235/150.2 |

Primary Examiner—Stephen G. Kunin
Attorney, Agent, or Firm—I. David Blumenfeld

[57] ABSTRACT

The invention relates to a flight control system for an aircraft which maintains reliable control of the angle of attack ($\alpha$) in those regions where rate of change of the lift coefficient ($C_L$) as a function of $\alpha$ goes to zero or becomes negative. This may cause a condition in which the feedback loop for the pitch moment generating control surface can inadvertently drive the aircraft into a stall or other unstable mode. Reliable control of angle of attack is achieved through a network which produces an estimated angle of attack signal ($\hat{\alpha}$) from the measured pitch rate of the aircraft, the lift acceleration error signal, a gravity control signal and sideslip and roll information. The estimated angle of attack signal is processed in a network which produces a pseudo coefficient of lift signal $\hat{C}_L$. The pseudo lift coefficient signal is processed to produce a pseudo lift (or normal) acceleration signal, $\hat{A}_Z$, which is supplied to the aircraft control loop. The pseudo signals track the actual coefficient of lift and lift acceleration characteristics of the aircraft over the angle of attack region where the response is linear or nearly so. That region of angle of attack where the actual aircraft coefficient of lift rate goes to zero and then negative, the pseudo signals remain linear. Hence, the feedback loop for the control surface does not see reduced lift acceleration signals and does not try to increase the angle of attack in order to achieve the acceleration demanded by the pilot's command. As a result, the control loop is prevented from inadvertently driving the aircraft into a stall or other unstable mode.

3 Claims, 2 Drawing Figures

HIGH ANGLE OF ATTACK AIRCRAFT CONTROL SYSTEM UTILIZING A PSEUDO ACCELERATION SIGNAL FOR CONTROL PURPOSES

The instant invention relates to an aircraft flight control system and more particularly, to an arrangement for exercising that maximum angle of attack the aircraft is capable of without inadvertently driving the aircraft into a stall or other unstable mode.

In typical flight control systems for high speed aircraft the feedback system for the pitch moment generating control surfaces of the aircraft uses some form of aircraft motion feedback or stability augmentation (damping, handling of the aircraft, etc.). Thus, in a flight control system of this type, the control loop typically utilizes pitch rate and normal or lift acceleration signals to drive the control surface in response to a command signal from the pilot. This type of feedback system for the control surfaces of the aircraft introduces stability problems in certain flight modes where the angle of attack approaches certain limiting or critical values at which the rate of change of the lift coefficient of the aircraft with angle of attack goes to zero or becomes negative. That is, for any given aircraft design, and particularly for straight or swept wing aircraft, the lift of the aircraft, is a function of the dynamic pressure $Q$ (which in turn is a function of the air density and the velocity squared), i.e., ($Q = \frac{1}{2}\rho V^2$) the aircraft wing area S and the mass of the aircraft. The coefficient of lift with angle of attack increases with angle of attack over a given range of $\alpha$; however, beyond a given angle of attack, which for the sake of convenience is denominated $\alpha_c$, the rate of change of lift coefficient with angle of attack is reduced towards zero or becomes negative. In this region of angle of attack and airplane is prone to stalling or other unstable modes of operation which can bring about loss of control in flights.

Certain flight modes are particularly susceptible to conditions in which the angle of attack approaches or reaches values at which the rate of change of lift coefficient goes to zero or becomes negative. As a result, the normal or lift acceleration seen by the feedback loop for the craft pitch moment control surfaces is not adequate to satisfy the loop control requirements and the feedback loop may tend to drive the aircraft to ever increasing angles of attack trying to achieve the needed lift acceleration to meet the control loop requirements. The aircraft may thus be driven by the control surface servoloop to increasing angles of attack and may result in an unstable flight mode with a risk of loss of control of the aircraft. For example, an aircraft when landing or takeoff normally does so at high angles of attack. That is so, because the total lift of the aircraft is reduced at the lower landing or takeoff since the dynamic pressure is reduced at the lower landing or takeoff speeds. The only way the lift on the aircraft can be increased when landing or taking off, is therefore, by increasing the coefficient or lift. As a consequence, the angle of attack at landing or takeoff is increased in order to maintain the proper total lift force. Thus the pilot tries to approach the highest permissible coeffiient of lift. As long as the angle of attack is in the region where the coefficient of lift is linear so that the proper rate of change of coefficient of lift with angle of attack is maintained, the aircraft functions properly and the servoloop for the flight control system maintained in a stable mode. However, if the angle of attack is near the critical region (i.e., the region where the rate of change coefficient of lift with angle of attack goes to zero or becomes negative), a perturbation may drive the craft angle of attack into the critical region. When this occurs the normal or lift acceleration signal decreases and goes toward zero. The feedback loop for the control surfaces responds to this change in the acceleration signal by increasing the angle of attack further to increase the lift coefficient and the lift acceleration. The result is that at zero or negative rates of change of coefficient of lift with angle of attack the control loop tends to drive the aircraft to higher and higher angles of attack in order to satisfy the command signal from the pilot and provide the proper amount of normal or lift acceleration to satisfy the loop requirements. Thus, the pilot in moving the aircraft to an angle of attack which approaches the critical angle of attack, may find the control system taking over and driving the aircraft angle of attack beyond that commanded by the pilot into a stall or other unstable flight mode Similarly, in a military aircraft the pilot in a high speed maneuver may want to go to the maximum angle of attack in order to get maximum normal or lift acceleration. Here again, there is a risk that the angle of attack may move into the region beyond the critical values, resulting in a decrease of rate of change of lift coefficient and lift acceleration. The control system may then take over the drive the aircraft into the stall mode by calling for increasing angles of attack to increase the lift acceleration in a region of angles of attack which cause further decrease in lift acceleration.

At present, this problem is solved by providing a safety margin for angle of attack, i.e., limiting the permissible angle of attack for both commercial and military aircraft to a value which is actually below the value at which the rate of change of the coefficient of lift rate is reduced and goes to zero or goes negative. As a result, the aircraft obviously operated at less than the maximum performance it is capable of. In a combat aircraft the maneuverability of the aircraft and its combat capability is reduced. In a commercial aircraft higher approach speeds are required which means faster landings, longer landings and longer stopping distance. This may affect the maximum weight permitted for the aircraft for landing. Thus, there are economic penalties which are associated with the solution which mandates providing a substantial safety margin to present inadvertent driving of the aircraft by the control surface servoloop into the unstable region.

Direct measurement of the angle of attack of the aircraft and utilization of this signal in the servoloop would seem to be a solution to the problem. However, angle of attack measuring instruments are not accurate enough in some instances where there is an irregular flow of air at the air foil. Furthermore, in many instances, the signals from an angle of attack sensor are so noisy due to conditions which produce preturbations such as rapid air changes so that the signal is difficult to extract from the background noise. When the signal is extracted by filtering or signal processing, the response time of the system is too slow for control purposes. Hence, systems in which angle of attack is measured directly and used in the feedback control for the control surfaces have not proved to be adequate to solve the problems outlined above.

Applicant has found that the angle of attack of which a given aircraft is capable may be optimized without introducing any difficulties by providing a system in which measured normal or lift acceleration is not used as a feedback signal in the control loop. Instead, an estimated angle of attack signal is generated and the estimated signal is then processed to produce a pseudo coefficient of lift signal which tracks the actual aircraft characteristics over the range at which the lift coefficient is linear. The pseudo-coefficient of lift signals, however, remain linear in the angle of attack region where the actual aircraft rate of change of coefficient of lift with angle of attack is no longer linear. This pseudo coefficient of lift signals is then further processed to produce a pseudo acceleration signal which also does not decrease as the angle of attack increases beyond the critical angle at which the rate of change of coefficient of lift with $\alpha$ begins to go to zero or goes negative. This pseudo acceleration signal is fed to the control surface servoloop so that the servo control loop does not try to increase the angle of attack in an attempt to increase the normal or lift acceleration. Thus, in the usual or linear region of operation the pseudo acceleration signal is identical with the actual acceleration. However, in the region beyond the critical angle of attack the pseudo acceleration signal simulates a linear response even though the actual acceleration is not increasing thereby stabilizing the control loop and preventing it from driving the control surface to even greater angles of attack. As a result, beyond the critical angle, the feedback loop sees a signal which indicates that the acceleration is proper to meet the loop characteristics even though the aircraft is not actually producing the acceleration to meet command. The feedback systems remains stable and does not continue angles of attack which risk an unstable control configuration.

It is therefore a principal purpose of this application to provide a flight control system in which optimum angle of attack is possible without introducing instabilities into the control surface feedback systems.

Yet another objective is to provide an aircraft control system capable of producing an optimum angle of attack which utilizes simulated control signals for application to the control loop to maintain the control loop stable.

Other advantages and objectives of the invention will become apparent as the description proceeds.

The instant invention is premised on the concept of generating a signal proportional to the angle of attack which is statically and dynamically accurate. This estimated angle of attack signal is used to generate a signal for control loop purposes. The estimated angle of attack signal is first converted to a pseudo coefficient of lift signal which in turn is then utilized to generate a pseudo acceleration signal. The pseudo acceleration signal tracks the coefficient of lift vs angle of attack $dC_L/d\alpha$ characteristics of the aircraft in the linear region. However, in the region where the rate of change of coefficient of lift vs angle of attack goes to zero or becomes negative, the pseudo coefficient of lift and the pseudo acceleration signals continue to be linear thus maintaining stability of the control loop as the pilot commands the optimum angle of attack of which the aircraft is capable.

The novel features which are characteristic of this invention are set forth with particularly in the appended claims. The invention itself, however, both as to its organization and method of operation, together with other objectives and advantages thereof, may best be understood by reference to the following description taken in connection with the accompanying drawings in which:

Figure 1:
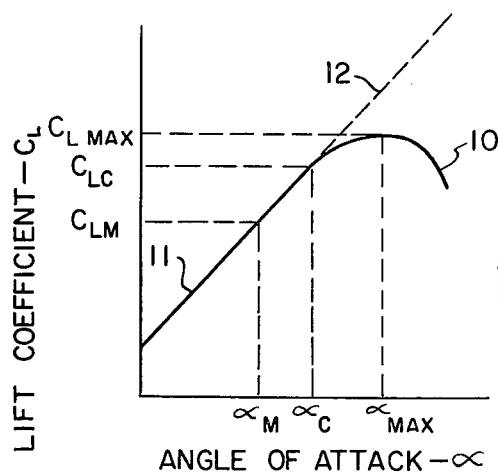
FIG. 1 is a graphical representation of the relationship between the coefficient of lift and the angle of attack for a typical aircraft and is useful in understanding the invention.

It will be useful in understanding the nature of the problem and the solution proposed by the instant invention to discuss initially the performance characteristics of an aircraft in connection with its stabilization control loops and the relationships between coefficient of lift, the angle of attack and the normal or lift acceleration of the aircraft. To this end, FIG. 1 shows the lift curve of an aircraft of the type in which the slope of the coefficient lift curve declines to zero and becomes negative as the angle of attack increases. This is a common wing lift characteristic associated with straight and swept wing aircraft. Thus, in FIG. 1, the coeffficient of lift $C_L$ is plotted along the ordinate and the angle of attack $\alpha$ is plotted along the abscissa. The solid line curve 10 illustrates the actual lift curve characteristic for a particular aircraft. It can be seen from zero angle of attack until a critical angle of attack $\alpha_c$ the lift coefficient vs angle of attack curve is linear and has a constant slope. For angles of attack beyond $\alpha_c$, it can be seen that the lift coefficient no longer increased linearly and eventually reaches a constant value and in the case of certain aircraft, may actually be reduced with further increases of $\alpha$. Thus, for angles of attack beyond $\alpha_c$ the rate of change of lift coefficient with angle of attack, i.e. $dC_L/d\alpha$ goes to zero and becomes negative. The lift coefficient $C_L$ for a given aircraft is normally defined as the ratio of the lift force (or weight of the aircraft) divided by the dynamic pressure $Q$ times the wing reference areas. The dynamic pressure, in turn, is a product of the air density $\rho$ and the velocity. Thus, the dynamic pressure is:

$$Q = \tfrac{1}{2}\rho V^2 \qquad (1)$$

The coefficient of lift equation may therefore be defined as follows $$C_L = \frac{A_{zm}}{QS} = \frac{A_{zm}}{\tfrac{1}{2}\rho V^2 S} \qquad (2)$$

From Equation (2), it can be seen that the lift force for the aircraft is therefore equal to the product of the dynamic pressure, the wing reference area, and the coefficient of lift. The equation for the lift force on the aircraft for any givn flight condition is therefore:

$$\text{Lift Force} = (\tfrac{1}{2}\rho V^2)\, S\, C_L = A_{zm} \qquad (3)$$

The lift force thus depends not only on the coefficient of lift which is a function of the angle of attack but also on the dynamic pressure which is a function of the square of the velocity. Thus, as pointed out before, in a landing or takeoff mode the speed of the vehicle is low and the lift force will be low unless the coefficient of lift is increased sufficiently to compensate for the reduction of the dynamic pressure. Thus, on landing or takeoff, it is customary for the pilot to increase the angle of attack $\alpha$ in order to increase the lift coefficient $C_L$ in curve 10 of FIG. 1 so that the total lift force on the aircraft remains essentially constant.

Obviously, it is desirable for the pilot to be able to approach the angle of attack $\alpha_{max}$ at which the lift coefficient for the given aircraft is maximum as closely as possible. As was discussed previously, there can be problems as $\alpha_c$ is exceeded with aircraft using normal or lift acceleration as a control parameter for the pitch moment generating servoloop. The incremental change in the normal or lift acceleration $A_z$ due to an incremental change in angle of attack $\alpha$ may be stated in terms of the lift curve slope $$C_{L_\alpha} = \frac{dC_L}{d\alpha} \quad A_z = \frac{Q \times S \times C_{L_\alpha}}{m} \Delta\alpha \quad (4)$$

The rate of change of lift acceleration thus depends on the rate of change or slope of the lift coefficient $C_{L_\alpha}$. It is clear from Equation (4) that if the slope of the $C_L$ V $\cdot \alpha$ curve decreases, i.e., the rate of change of $C_L$ with $\alpha$ begins to decrease and goes to zero or even becomes negative, that the normal or lift acceleration will similarly be reduced. It will now become apparent, therefore, that if the angle of attack reaches or goes beyond $\alpha_c$, where the rate of change of lift coefficient with $\alpha$ goes to zero, the normal or lift acceleration of the aircraft is reduced. The feedback servoloop for the control surface sees a dropping lift acceleration signal so that the servoloop is not stabilized for the pilot's command signal. The servloop drives the control surface to give increasing angles of attack in an attempt to provide more lift and therefore the normal or lift acceleration required to satisfy loop conditions. The result is that at reduced, zero or negative slope the control system tends to drive the aircraft into higher and higher angles of attack in order to satisfy the command signal. The pilot thus may find the situation where the feedback system for the control surface actually drives the plane into a stall or otherwise unstable region. That is, having commanded an angle of attack at or just below $\alpha_c$, any sort of perturbation which inadvertently drives the angle of attack into the region beyond $\alpha_c$ can initiate this process.

As a result, in commercial aircraft and even in military aircraft the pilots are instructed to maintain a margin of safety between the critical angle of attack and the maximum permissible angle of attack. This margin of safety shown graphically in FIG. 1 by means of an angle of attack $\alpha_m$ which produces a maximum permissible lift coefficient of $CL_m$. That is, the pilots are instructed never to exceed the angle of attack $\alpha_m$ even though that angle of attack is below or substantially below the critical angle of attack $\alpha_c$. The obvious results of limiting the maximum angle of attack a value $\alpha_m$ below the critical angle is that in the case of a military aircraft the maneuverability of the vehicle is restricted and in the case of commercial aircraft causes higher landing speed, longer landing, longer stopping distance, less efficient utilization of fuel and all of the economically undesirable consequences that come along with these characteristics.

Applicant has found that these problems may be avoided and higher performance achieved by allowing the aircraft to approach much closer to or exceed the critical angle of attack $\alpha_c$ by means of an arrangement in which a signal is generated which tracks the lift coefficients $C_L$ with angle of attack over the liner region 11 of curve 10 and produces a pseudo lift coefficient curve shown by the dashed line 12, which is linear for angles of attack beyond $\alpha_c$. This simulated or pseudo lift coefficient characteristic is utilized to produce, by means of suitable signal processing, a pseudo normal or lift acceleration signal which is linear for all angles of attack. This pseudo acceleration signal is fed to the servoloop for the aircraft control surfaces so that the control loop sees an acceleration signal that does not go to zero or go negative if the angle of attack increases beyond $\alpha_c$.

In the linear region of the $C_L$ vs $\alpha$ characteristic of the aircraft, as shown by the portion 11 of curve 10, the pseudo coefficient of lift signal and the pseudo acceleration signal which is derived therefrom tracks actual coefficient of lift and the measured acceleration signals. However, in the critical areas beyond $\alpha_c$ when the rate of change of lift coefficient with $\alpha$ begins to drop and then goes to zero or becomes negative, the pseudo acceleration signal continues to have a linear characteristic thereby providing stability of the control system and allowing the pilot to use as much angle of attack as is useful to him taking into account other considerations such as drag, instabilities in other axis and any other particular restrictions.

Figure 2:
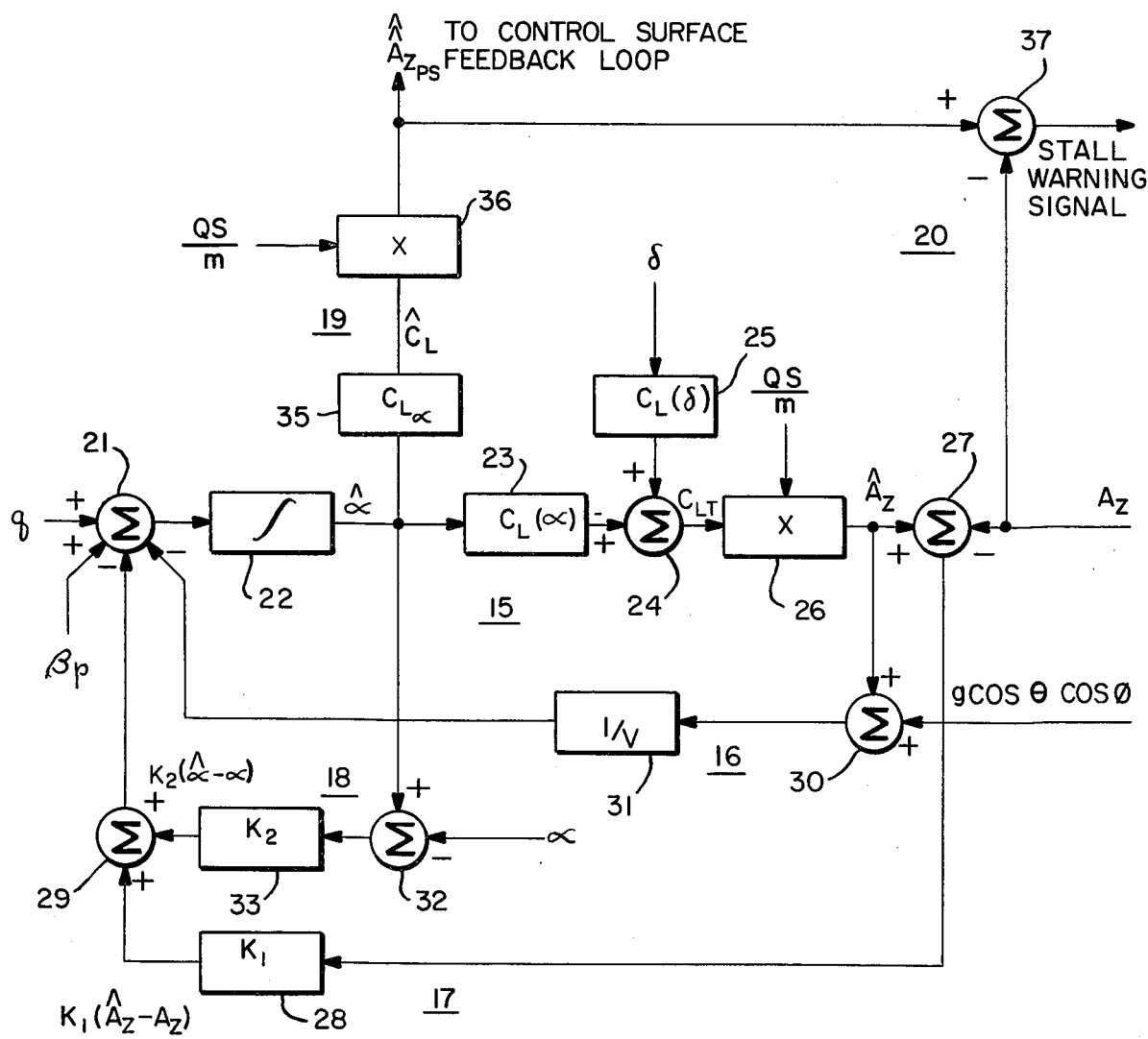
FIG. 2 is a block diagram of circuitry for producing the estimated angle of attack, the pseudo coefficient of lift and the pseudo acceleration signal for use in the control loop of the aircraft.

FIG. 2 illustrates in block diagram form a network for generating such a pseudo acceleration signal. The pseudo acceleration signal is generated by first producing an estimated angle of attack signal ($\hat{\alpha}$) from a signal processing network which constitutes a model of the aircraft dynamics. This estimated angle of attack system $\hat{\alpha}$ is then processed in a network which has a characteristic as shown by the curves 11 and 12 of FIG. 1, i.e., a network which produces a pseudo rate of change of coefficient of lift signal $$\left( \hat{C}_{L_\alpha} = \frac{d\hat{C}_L}{d\alpha} \right).$$

This pseudo lift rate signal, unlike the actual aircraft characteristics is linear beyond the critical angle of attack $\alpha_c$. The pseudo rate of change of coefficient of lift signal $\hat{C}_{L_\alpha}$ is then multiplied by a signal proportional to the ratio of the product of the dynamic pressure and the wing reference area divided by the lift force, i.e., QS/m. The product of pseudo coefficient of lift and QS/m is a pseudo acceleration signal which is applied to the servoloop for control purposes.

FIG. 2 shows the network for generating an estimated angle of attack signal $\hat{\alpha}$ from certain measured quantities as pitch rate, and the pseudo rate of change of lift signal and the pseudo acceleration signal from $\hat{\alpha}$. In addition, a stall warning signal generating network is provided which by measuring the difference between the pseudo lift acceleration signal and the actual lift acceleration signal provides a signal which is an accurate measure or indication of penetration of the aircraft into the stall region. That is, since the pseudo lift vs $\alpha$ characteristics and the actual lift vs $\alpha$ characteristics differ from each other only in the area where $\alpha > \alpha_c$ which represents the potential stall or unstable region any difference between the pseudo and measured values which exceed a predetermined value representative of measuring error, is an indication of penetration into the stall region.

The network comprises a first channel 15 in which the model of the particular aircraft dynamics is simulated to produce an estimated angle of attack signal $\alpha$ and an estimated lift acceleration signal $\hat{A}_z$ in response to measured pitch rate ($q$), normal or lift acceleration ($A_z$), surface deflection ($\delta$) and actual angle of attack ($\alpha$). The inputs to channel 15 are measured pitch rate signals from any suitable pitch rate measuring inertial device; a signal proportional to angular pitch rate around the pitch axis from a second channel 16, a normal or lift acceleration vector error signal from channel 17, an angle of attack error signal from channel 18 and a signal proportional to the product of the craft side slip $\beta$ and roll $\rho$ which may be obtained from a side slip rate sensor and the craft roll gyro, or from the craft's air computer. Channel 15 therefore produces two signals $\hat{\alpha}$ and $\hat{A}_z$ which may then be processed further to produce the desired pseudo acceleration signal. The pseudo acceleration signal is generated in a signal processing path 19 in which the estimated angle of attack signal $\hat{\alpha}$ is converted to a pseudo coefficient of lift signal $\hat{C}_L$ and thereafter converted to pseudo acceleration $\hat{A}_z$. The output channel 19 is applied to the servoloop for the aircraft pitch moment generating surface and also to channel 20 in which the pseudo acceleration signal is compared to the actual acceleration signal to produce a stall warning signal whenever the two signals differ sufficiently to indicate a substantial penetration into the stall region, beyond the critical angle of attack $\alpha_c$.

Channel 15 includes an input summing node 21 which has a measured pitch rate signal $q$, which represents the pitch rate commanded as the result of the pilot's command for any angle of attack as one input. The signal representative of the angular pitch rate around the pitch axis from channel 16 is also applied to the summing node as is a signal representing the product of the side slip times the roll rate which may be derived, as pointed out before from a side slip sensor and roll gyro. In addition, a normal or lift acceleration error signal, and an angle of attack error signal from paths 17 and 18 are also inputs to summing node 21. Summing node 21 is so arranged that the output is the pitch rate $q$ plus the product of the side slip and roll rate $\beta \rho$ minus the angular path rate about the pitch axis, minus the error signals. This by definition represents the force equation on the aircraft. That is, the pitch rate of the body plus the product of the side slip and the roll rate minus the angular pitch rate around the pitch axis is by definition angle of attack rate $d\alpha/dt$. This resultant signal is applied to an integrating network 22 to produce at its output a signal which is representative of the estimated angle of attack $\hat{\alpha}$. The estimated angle of attack signal from integrator 22 is the input signal to a coefficient of lift network 23 which produces an output signal which is coefficent of lift with $\alpha$ that corresponds to the $C_L$ V $\cdot$ $\alpha$ curve 11 of FIG. 1. That is, network 23, has a response characteristic identical to the coefficient of lift versus angle of attack curve. This may be achieved in various ways for example, a microprocessor may be used in which a polynomial of the curve is stored and called out for various values $C_L$ of the estimated angle of attack $\hat{\alpha}$. Alternatively, network 23 may consist of a plurality of linear gain amplifiers having variable gains for various portions of the curve having different slopes. In other words, the network 23 may, in any number of well-known ways, produce an output signal over the entire range of angle of attack which is a function of the rate of change of $C_L$ with $\alpha$ i.e., function $C_{L\alpha} = dC_L/d\alpha$ output signal from network 23 is applied to a summing node 24 in which an output signal representative of the lift due to the tail surface deflection is added to the angle of attack lift signal to produce an output which is the total lift coefficient, $C_{LT}$. To this end, a signal $\delta$ which measures tail deflection is applied to a network 25 which produces an output $C_L(\delta)$ which is $\delta C_{L\delta} = (dC_L/d\delta) \times \delta$. In other words, network 25 may be an amplifier having a gain characteristic such that its output is proportional to the change in the coefficient of lift due to changes in $\delta$ or may also be a microprocessor in which the particular lift rate versus $\delta$ characteristics is tored to produce the desired output. Hence, the output from summing node 24 is a signal representative of the total lift coefficient. This signal is applied as one input to multiplier 26. The other input to multiplier 26 is a signal representative of the product of the dynamic pressure and wing reference area divided by the mass, i.e., QS/m. The product of the input signals to the multiplier is $QS/m\ C_L$ which by definition is the normal or lift acceleration. Thus, the output of multiplier 26 is an estimated normal or lift acceleration component $\hat{A}_z$ which is combined in a summing node 27 with the actual measured lift acceleration signal $\hat{A}_z$. The output from summing node 27 is therefore the lift acceleration error signal. This error signal is applied to channel 17 which includes a suitable gain network 28 to apply an acceleration signal $K_1(\hat{A}_z - A_z)$ as one input to an error summing node 29.

The estimated lift acceleration signal $\hat{A}_z$ is also applied to a summing node 30 in channel 16 and is combined with a signal proportional to the $g$, i.e., $g \cos \theta \cos \phi$ where $\theta$ and $\phi$ are Euler angles which define the effect of gravity forces on the vehicle. Thus, $\theta$ is the angle the longitudinal axis of the aircraft and the horizontal and $\phi$ is the angle of rotation of the transverse or wing axis about the longitudinal axis from parallelism with the horizon. The $g \cos \theta \cos \phi$ signal may be obtained from suitable sensing instruments or the aircraft air data computer. The output of summing node 30 is a signal which is proportional to the centrifugal acceleration of the aircraft around the pitch axis. This signal is multiplied in network 31 by a factor representing $1/V$ where $V$ is the aircraft velocity to produce a signal which is proportional to the angular rate of the velocity vector around the aircraft pitch axis. This signal is then applied as one of the inputs to summing node 21 in channel 15.

The estimated angle of attack signal $\hat{\alpha}$ at the output of integrator 22 is also applied as one input to a summing node 32 in angle of attack error signal channel 18. The other input to summing node 32 is a measured angle of attack signal. The output from summing node 32 is the difference between these two signals and therefore represents any error between the estimated and the actual angle of attack. This signal is suitably amplified in a network 33 to produce an error signal, $K_2(\hat{\alpha} - \alpha)$ to error summing node 29. The output from error summing node 29 is, as pointed out previously, applied to summing node 21 in channel 15 to produce at the output of that summing node a signal which is representative of those aircraft dynamic forces which represent $d\alpha/dt$, i.e., rate of change of angle of attack, which is then integrated to produce the estimated angle of attack $\hat{\alpha}$.

Having obtained an estimated angle of attack signal at the output of integrator 22, this estimated angle of attack signal is also applied to channel 19 in which the signal is first processed to produce a pseudo lift coefficient signal and then processed further to produce a pseudo acceleration signal $\tilde{A}_z$. The estimated angle of attack signal $\hat{\alpha}$ is applied to a network 35 which produces an output signal which is proportional to a rate of change of coefficient of lift which is linear over the entire range of $\alpha$ and has the same slope as the linear portion 11 of the coefficient of lift versus $\alpha$ curve of FIG. 1. That is, network 35, which may typically be an amplifier having a linear gain over its entire range, has a gain characteristic which corresponds to the slope of the linear portion 11 of curve 10 of FIG. 2. However, the network is also characterized by the fact that at angles beyond $\alpha_c$ the output of network 35 continues to be linear and has the same slope. Thus, from angle of attack ranges from 0 to $\alpha_c$, the output of network 35 tracks the actual characteristics of the aircraft in terms of the rate of change of the lift coefficient. However, beyond the critical angle where the rate of change of coefficient of lift with angle of attack is reduced and goes to zero or becomes negative, the output of network 35 continues to be positive and linear. It is thus a pseudo rate of change of coefficient of lift signal.

This signal is then applied as one input to a multiplier 36 which has as its other input a signal representing $QS/m$, i.e., the product of the dynamic pressure and the reference wing area divided by the aircraft mass. As a result, the output of multiplier 36 is a signal representative of acceleration. Over the angle of attack ranges from 0 to $\alpha_c$ the output from multiplier 36 is an acceleration signal which is the same as the actual normal or lift acceleration of the aircraft. However, for angles beyond the critical angle of attack, $\alpha_c$, the output of multiplier 36 is a pseudo acceleration signal since it continues to show a constant change of acceleration in proportion to changes of angle of attack whereas the actual acceleration is reduced because the rate of change $C_L$ which affects lift acceleration goes to zero or negative with the particular aircraft response shown in FIG. 1. The pseudo acceleration signal is then applied to the aircraft control network, not shown.

The pseudo acceleration signal from channel 19 is also applied as one input to a summing node 37 in the stall warning channel 20. The other input to summing node 37 is the measured normal or lift acceleration. The output signal from summing node 37 is therefore the difference between the pseudo acceleration signal and the measured acceleration signal. It will be obvious from the prior description and consideration of the aircraft characteristics as illustrated by the curve of FIG. 1, that the difference between these two signals is zero or very small for angles of attack up to $\alpha_c$ for in this region the pseudo acceleration $\tilde{A}_z$ tracks the actual acceleration $A_z$. Beyond $\alpha_c$ $\tilde{A}_z$ becomes increasingly larger than $A_z$. Hence, whenever the difference between the pseudo acceleration signal and the measured acceleration signal exceeds a predetermined value, which is chosen to be larger than normal expected measuring errors and computation errors, i.e., $(\tilde{A}_z - A_v) \geq K_3$, then this is a clear indication that the angle of attack of the aircraft has penetrated into the unstable region. A stall warning signal or indicator may be then actuated by the signal to provide the pilot a visual or audible warning of the condition.

It can be seen therefore from previous descriptions that the network illustrated in FIG. 2 provides an acceleration signal for use in feedback loop of the aircraft control surfaces which accurately tracks the lift acceleration of the aircraft in the linear region of the aircraft performance but provides a pseudo acceleration signal for use in the control loop which continues to be linear in the area beyond the critical angle of attack thereby preventing the feedback loop for the control surfaces from inadvertently driving the aircraft to an angle of attack which brings into a stall or otherwise unstable condition. This obviously permits the pilot to approach the critical angle of attack much more closely than was previously possible when an elaborate safety margin had to be provided in order to prevent inadvertent perturbations from causing the control loop to drive the aircraft into a stall or other unstable condition.

While a particular embodiment of the invention has been illustrated and described, it will be apparent that various modifications may be made in the instrumentalities and arrangements described without departing from the true spirit and scope of the invention as defined in the appended claims.

What is claimed as new and desired to be secured as Letters Patent in the United States is:

1. In an aircraft control system utilizing angle of attack and lift acceleration signals for control purposes, the combination of:
   a. means for indirectly producing an estimated angle of attack signal from measured aircraft pitch moment generating signal, including:
      1. network means simulating dynamic lift characteristics of an aircraft, said network means providing an output signal proportional to the estimated change of the aircraft coefficient of lift for any variation in angle of attack, said output signal being representative of the actual dynamic lift characteristics,
      2. network means to convert said estimated coefficient of lift signal an estimated aircraft lift acceleration signal which is representative of the actual lift acceleration characteristics of an aircraft,
      3. means for combining the estimated lift acceleration signal with signals proportional to aircraft pitch rate, roll, sideslip angle and an angular rate of the aircraft around a pitch axis to produce a signal which represents an estimated angle of attack,
   b. means responsive to the estimated angle of attack signal to produce a pseudo coefficient of lift signal which is linear with angle of attack over an entire range of operational values and which is thus identical with the assumed aircraft characteristics in the region where an aircraft coefficient of lift versus angle of attack is linear but deviates from the actual aircraft dynamic lift characteristics where an aircraft rate of change of coefficient of lift decreases and goes to zero with increases in angle of attack, including a newtork having a linear output signal response characteristic over the entire range of input signals and means to apply said estimated angle of attack signal as an input to said network,
   c. and means to convert said pseudo coefficient of lift signal to a pseudo lift acceleration signal which is linear over an entire range of aircraft angles of attack.

2. The system according to claim 1 wherein said signal representative of the angular rate of movement of the aircraft around the pitch axis is produced by combining the estimated aircraft lift acceleration signal with signals representing gravitational forces acting on the aircraft and the velocity of the aircraft.

3. The system according to claim 1 wherein the pseudo lift acceleration signal is compared to the measured aircraft lift acceleration signal to produce a signal representative of the difference between the actual and pseudo acceleration as an indication of the penetration of the aircraft into a region in which the coefficient of lift and lift acceleration versus angle of attack relationship results in decreasing lift acceleration with increasing angle of attack and hence an indication of an aircrafts' penetration into a stall region.

* * * * *